US012322243B2

(12) United States Patent
Purohit et al.

(10) Patent No.: US 12,322,243 B2
(45) Date of Patent: Jun. 3, 2025

(54) SYSTEMS AND METHODS FOR GAMING MACHINE DIAGNOSTIC ANALYSIS

(71) Applicant: Aristocrat Technologies, Inc., Las Vegas, NV (US)

(72) Inventors: Nimish Purohit, Las Vegas, NV (US); Rajendrasinh Jadeja, Las Vegas, NV (US); Xiaoqiang Gong, Henderson, NV (US); Bo Liu, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/191,693

(22) Filed: Mar. 28, 2023

(65) Prior Publication Data

US 2023/0237870 A1 Jul. 27, 2023

Related U.S. Application Data

(63) Continuation of application No. 17/222,763, filed on Apr. 5, 2021, now Pat. No. 11,636,726.

(Continued)

(51) Int. Cl.
*G07F 17/32* (2006.01)

(52) U.S. Cl.
CPC ...... *G07F 17/3223* (2013.01); *G07F 17/3206* (2013.01); *G07F 17/3216* (2013.01); *G07F 17/3225* (2013.01)

(58) Field of Classification Search
CPC ......................... G07F 17/3232; G07F 17/3234
See application file for complete search history.

(56) References Cited

U.S. PATENT DOCUMENTS 4,582,324 A * 4/1986 Koza ........................ G07F 17/32 463/16
5,283,422 A * 2/1994 Storch ...................... G06K 7/14 235/375

(Continued)

FOREIGN PATENT DOCUMENTS

AU 2019203135 A1 12/2019
GB 2573622 4/2019

(Continued)

OTHER PUBLICATIONS

Brendan Koemer, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.

(Continued)

*Primary Examiner* — Dmitry Suhol
*Assistant Examiner* — Jason Pinheiro
(74) *Attorney, Agent, or Firm* — Armstrong Teasdale LLP

(57) ABSTRACT

A diagnostic system for electronic gaming machines (EGMs) includes a power supply, and a diagnostic device in electrical connection with the power supply, the diagnostic device configured for placement within a cabinet of an EGM. The diagnostic device includes an attachment device configured to couple the diagnostic device to the EGM, a sensor array including at least one sensor for sensing a condition associated with the EGM and configured to generate conditions data based on the sensed condition, a communications device configured to transmit the conditions data to a remote location, a memory configured to store the conditions data, and a processor configured to analyze the conditions data and determine a diagnostic evaluation based upon the analyzed conditions data.

20 Claims, 8 Drawing Sheets

Related U.S. Application Data

(60) Provisional application No. 63/022,192, filed on May 8, 2020.

(56) References Cited

U.S. PATENT DOCUMENTS 5,326,104 A * 7/1994 Pease ...................... A63F 3/081 902/23
5,605,334 A * 2/1997 McCrea, Jr. ........ G07F 17/3293 273/309
5,611,730 A 3/1997 Weiss
5,643,086 A * 7/1997 Alcorn .................... G06F 21/57 463/16
5,735,742 A * 4/1998 French .................. G07F 7/0866 273/138.2
5,970,143 A * 10/1999 Schneier ............. G07F 17/3218 713/181
6,154,131 A * 11/2000 Jones, II ............. G07F 17/3206 340/556
6,165,069 A * 12/2000 Sines .................. G07F 17/3216 273/274
6,383,076 B1 5/2002 Tiedeken
6,460,848 B1 * 10/2002 Soltys ................. G07F 17/3251 463/47
6,488,585 B1 * 12/2002 Wells ........................ G06F 8/61 463/43
6,641,484 B2 * 11/2003 Oles .................... G07F 17/3241 463/47
7,003,139 B2 2/2006 Endrikhovski
RE39,370 E * 10/2006 Alcorn ................ G07F 17/3288 463/29
7,154,380 B1 * 12/2006 Tarrab, Jr. ............ G04G 15/006 348/730
7,168,089 B2 1/2007 Nguyen
7,316,615 B2 1/2008 Soltys
7,581,256 B2 * 8/2009 Cockerille .......... G07F 17/3241 713/193
7,708,638 B2 5/2010 Enzminger
7,736,234 B2 * 6/2010 Cockerille .............. G07F 17/32 365/158
7,815,507 B2 * 10/2010 Parrott .................... G07F 17/32 345/157
7,951,003 B2 5/2011 Russell
8,157,647 B2 4/2012 House
8,303,417 B2 11/2012 Burke
8,366,542 B2 * 2/2013 White ................. G07F 17/3234 463/25
8,407,147 B2 * 3/2013 Lenger .................. G06F 9/4401 705/51
8,449,378 B2 5/2013 Michaelson
8,608,568 B2 * 12/2013 Carpenter ............... G07F 17/32 463/29
8,628,413 B2 * 1/2014 LeMay ............... G07F 17/3202 463/31
8,657,674 B2 * 2/2014 LeMay ............... G07F 17/3234 463/25
8,777,758 B2 * 7/2014 Anderson ........... G07F 17/3202 463/47
8,801,517 B2 8/2014 Walker
8,917,971 B2 12/2014 Woods
8,944,910 B1 * 2/2015 Boyle ................. G07F 17/3223 463/30
8,974,304 B2 3/2015 Gagner
9,033,791 B2 5/2015 Hamlin
9,084,937 B2 7/2015 Gadher
9,117,329 B2 8/2015 Osgood
9,117,339 B2 8/2015 Burke
9,269,216 B2 2/2016 Keilwert
9,325,203 B2 * 4/2016 Nguyen .............. G07F 17/3227
9,367,991 B2 6/2016 Acres
9,616,324 B2 * 4/2017 Krenn ....................... A63F 1/14
9,865,139 B2 1/2018 Walker
10,037,648 B2 7/2018 Acres
10,223,679 B2 3/2019 Lee
10,229,561 B2 3/2019 Cage
10,275,583 B2 4/2019 Leuthardt
10,297,106 B1 5/2019 Simons
10,322,727 B1 6/2019 Chan
10,425,426 B1 9/2019 Simons
10,497,204 B2 * 12/2019 Weber ................. G07F 17/3202
10,530,569 B2 1/2020 Bisti
10,549,202 B2 2/2020 McCoy
10,706,678 B2 * 7/2020 Nguyen .............. G07F 17/3225
10,741,017 B2 8/2020 Silva
10,824,759 B1 11/2020 Magerkurth
10,850,204 B2 12/2020 Bruzzo
10,943,438 B2 3/2021 Cage
10,949,417 B2 3/2021 Kurian
10,950,081 B2 3/2021 Baker
10,991,201 B2 * 4/2021 McDowell ............. G06Q 50/34
11,004,304 B2 * 5/2021 Nguyen .............. G07F 17/3225
11,023,981 B2 6/2021 Hu
11,045,726 B2 6/2021 Hennessy
11,107,321 B2 8/2021 Ovalle
11,158,170 B2 10/2021 Thomas
11,159,334 B2 10/2021 Kuzma
11,159,945 B2 10/2021 Obaidi
11,189,130 B2 * 11/2021 Purohit ............... G07F 17/3223
11,195,371 B2 12/2021 Purohit
11,232,442 B2 1/2022 Liu
11,245,529 B2 2/2022 Clark
11,281,644 B2 3/2022 Shimamura
11,288,921 B2 * 3/2022 Haishima ............ G07F 17/3241
11,308,761 B2 4/2022 Purohit
11,373,446 B1 6/2022 Beisel
11,373,480 B2 6/2022 Taylor
11,380,070 B2 * 7/2022 Koidahl .................... G06T 7/20
11,651,651 B2 5/2023 Purohit
11,688,233 B2 * 6/2023 Acres ...................... G07F 17/34 463/20
11,783,669 B2 10/2023 Schwartz
2001/0019966 A1 * 9/2001 Idaka ...................... G07F 17/32 463/40
2002/0025850 A1 * 2/2002 Hafezi ................ G07F 17/3234 463/29
2002/0032051 A1 * 3/2002 Stockdale ........... G07F 17/3202 463/29
2002/0138461 A1 9/2002 Sinclair
2002/0142831 A1 10/2002 Mattice
2002/0152120 A1 * 10/2002 Howington ........ G06Q 30/0224 902/23
2003/0032485 A1 * 2/2003 Cockerille .......... G07F 17/3241 463/43
2003/0041085 A1 2/2003 Sato
2003/0060283 A1 3/2003 Rowe
2004/0048669 A1 3/2004 Rowe
2004/0127277 A1 * 7/2004 Walker .................... H04L 63/08 463/16
2004/0235562 A1 11/2004 Kiely
2005/0043086 A1 * 2/2005 Schneider ............... G07F 17/32 463/25
2005/0054430 A1 3/2005 Pitman
2005/0130728 A1 * 6/2005 Nguyen .............. G07F 17/3218 463/16
2006/0035713 A1 2/2006 Cockerille
2006/0063595 A1 3/2006 Kondo
2006/0100009 A1 * 5/2006 Walker ................ G07F 17/3227 463/25
2006/0111172 A1 * 5/2006 Walker ................ G07F 17/3213 463/16
2006/0166732 A1 7/2006 Lechner
2006/0189382 A1 * 8/2006 Muir ....................... G07F 17/32 463/29
2006/0205488 A1 9/2006 Gagner
2006/0264253 A1 * 11/2006 Trobia ................ G07F 17/3202 463/19
2007/0054734 A1 * 3/2007 Morrow .................. G07F 17/32 463/29
2008/0058059 A1 3/2008 Fitzsimons
2008/0167118 A1 * 7/2008 Kroeckel ............ G07F 17/3293 463/31

(56) References Cited

U.S. PATENT DOCUMENTS

2008/0182667 A1* 7/2008 Davis ..................... G07F 17/32 463/43
2008/0214300 A1* 9/2008 Williams ........... H04L 63/0428 463/29
2008/0235746 A1 9/2008 Peters
2009/0042640 A1* 2/2009 Gagner .................. G07F 17/34 463/24
2009/0061987 A1* 3/2009 Canterbury ......... G07F 17/3202 463/43
2009/0124392 A1 5/2009 Ruppert
2009/0181720 A1* 7/2009 Marsico ............. G07F 17/3232 463/41
2009/0197660 A1 8/2009 Cramer
2009/0247293 A1 10/2009 Lenger
2010/0093428 A1* 4/2010 Mattice .............. G07F 17/3239 463/25
2010/0203961 A1* 8/2010 Burke ................. G07F 17/3232 463/29
2010/0234094 A1 9/2010 Gagner
2010/0248812 A1 9/2010 Pacey
2010/0255902 A1 10/2010 Goldstein
2010/0291994 A1 11/2010 Denham
2011/0089730 A1 4/2011 Higgs
2011/0102546 A1 5/2011 Dhuse
2011/0109134 A1 5/2011 Filipour
2011/0111838 A1 5/2011 Bauer
2011/0117984 A1* 5/2011 Shimabukuro ..... G07F 17/3223 463/16
2011/0124405 A1 5/2011 Okada
2011/0195789 A1 8/2011 Wells
2012/0021824 A1* 1/2012 Wells ..................... G07F 17/32 463/29
2012/0028703 A1 2/2012 Anderson
2012/0035751 A1 2/2012 Dimitriadis
2012/0100908 A1* 4/2012 Wells ................. G07F 17/3241 463/25
2012/0129596 A1* 5/2012 Thackston .......... G07F 17/3206 463/29
2012/0193956 A1 8/2012 Baker
2012/0229508 A1* 9/2012 Wigdor ................ G06T 19/006 345/633
2012/0322564 A1 12/2012 Granger
2013/0065669 A1 3/2013 Michaelson
2013/0065670 A1 3/2013 Michaelson
2013/0072304 A1 3/2013 Brosnan
2013/0084959 A1 4/2013 Nelson
2013/0084960 A1 4/2013 Frady
2013/0084973 A1 4/2013 Frady
2013/0085001 A1 4/2013 Anderson
2013/0137498 A1 5/2013 Willyard
2013/0190095 A1* 7/2013 Gadher .................. A63F 13/77 463/1
2013/0196755 A1* 8/2013 Nelson ............... G07F 17/3241 463/29
2014/0219492 A1 8/2014 Pelliccio
2014/0235324 A1 8/2014 Ryan
2014/0256450 A1* 9/2014 Bleich ...................... G06F 1/28 463/43
2014/0274255 A1 9/2014 Walkingstick
2014/0274309 A1* 9/2014 Nguyen ............. G07F 17/3251 463/31
2014/0309012 A1 10/2014 Anderson
2014/0323194 A1 10/2014 Keilwert
2014/0324749 A1 10/2014 Peters
2015/0279155 A1 10/2015 Chun
2015/0302690 A1 10/2015 Hutchinson-Kay
2016/0012465 A1 1/2016 Sharp
2016/0023116 A1 1/2016 Wire
2016/0093144 A1 3/2016 Kitamura
2016/0292558 A1 10/2016 Daniel
2016/0335840 A1 11/2016 Acres
2017/0061731 A1 3/2017 Colvin
2017/0161991 A1 6/2017 Ayati
2017/0278304 A1* 9/2017 Hildreth ............. G06F 3/04815
2017/0287593 A1 10/2017 Ovalle
2017/0293669 A1 10/2017 Madhavan
2017/0300876 A1 10/2017 Musiala, Jr.
2017/0316644 A1 11/2017 Arnone
2018/0019867 A1 1/2018 Davis
2018/0039942 A1 2/2018 Rogers
2018/0089956 A1 3/2018 Nagaragatta
2018/0096175 A1 4/2018 Schmeling
2018/0096752 A1 4/2018 Ovalle
2018/0114403 A1 4/2018 Jayachandran
2018/0117446 A1 5/2018 Tran
2018/0225640 A1 8/2018 Chapman
2018/0247191 A1 8/2018 Katz
2018/0293834 A1 10/2018 Cage
2018/0370476 A1 12/2018 Alequin
2019/0028264 A1 1/2019 Bisti
2019/0028265 A1 1/2019 Bisti
2019/0066488 A1 2/2019 Locke
2019/0080554 A1 3/2019 Barbour
2019/0096170 A1 3/2019 Lewis
2019/0096191 A1 3/2019 Stuehling
2019/0102986 A1 4/2019 Nelson
2019/0109714 A1 4/2019 Clark
2019/0122300 A1 4/2019 O'Brien
2019/0122492 A1 4/2019 Nguyen
2019/0122495 A1 4/2019 Yi
2019/0130698 A1 5/2019 Simons
2019/0130701 A1 5/2019 Simons
2019/0143207 A1 5/2019 Kumar
2019/0149418 A1 5/2019 Bertsche
2019/0163672 A1 5/2019 Shmueli
2019/0180558 A1 6/2019 Merati
2019/0188653 A1 6/2019 Khaund
2019/0205894 A1 7/2019 Gonzales, Jr.
2019/0221076 A1 7/2019 Simons
2019/0280875 A1 9/2019 Ragnoni
2019/0289019 A1 9/2019 Thekadath
2019/0295371 A1 9/2019 Simons
2019/0296915 A1 9/2019 Lancashire
2019/0314726 A1 10/2019 Masini
2019/0321722 A1 10/2019 Hennessy
2019/0325700 A1 10/2019 Jayachandran
2019/0333285 A1 10/2019 Delia
2019/0352125 A1 11/2019 Wooten
2019/0355209 A1 11/2019 Sorey
2019/0373015 A1 12/2019 Kozloski
2020/0020194 A1 1/2020 Higgins
2020/0021600 A1 1/2020 Simons
2020/0027315 A1 1/2020 Cotton
2020/0051081 A1 2/2020 Valecha
2020/0051368 A1 2/2020 Pustizzi
2020/0066093 A1 2/2020 Schwartz
2020/0090463 A1 3/2020 Mohrhardt
2020/0097862 A1 3/2020 Arora
2020/0105096 A1 4/2020 Ovalle
2020/0110855 A1 4/2020 Cunningham
2020/0145217 A1 5/2020 Clark
2020/0152005 A1 5/2020 Higgins
2020/0168036 A1 5/2020 Schwartz
2020/0168038 A1 5/2020 Schwartz
2020/0168041 A1 5/2020 Schwartz
2020/0189420 A1 6/2020 Urano
2020/0193764 A1 6/2020 Ovalle
2020/0202668 A1 6/2020 Cotta
2020/0211325 A1 7/2020 Kaizerman
2020/0380817 A1 12/2020 Purohit
2020/0410433 A1* 12/2020 Rahilly ................. G16H 20/13
2020/0412813 A1 12/2020 Mong
2021/0037013 A1 2/2021 Salkintzis
2021/0174634 A1 6/2021 Purohit
2021/0233351 A1 7/2021 Meltzer
2021/0241566 A1 8/2021 Russ
2021/0255995 A1 8/2021 Shmueli
2021/0327208 A1 10/2021 Colvin
2021/0335085 A1 10/2021 Froy, Jr.
2021/0350659 A1 11/2021 Purohit
2022/0006831 A1 1/2022 Garg
2022/0030000 A1 1/2022 Lee

(56) References Cited

U.S. PATENT DOCUMENTS

| | | | |
|---|---|---|---|
| 2022/0038280 A1 | 2/2022 | Punal | |
| 2022/0207959 A1 | 6/2022 | Schwartz | |
| 2022/0215719 A1 | 7/2022 | Schwartz | |
| 2022/0383695 A1 | 12/2022 | DeMarco | |
| 2022/0392312 A1 | 12/2022 | Marks | |
| 2023/0130583 A1 | 4/2023 | Shaffer, Jr. | |
| 2023/0306816 A1 | 9/2023 | Nimish | |
| 2023/0419778 A1 | 12/2023 | Schwartz | |

FOREIGN PATENT DOCUMENTS

| | | |
|---|---|---|
| WO | 2018060951 A1 | 4/2018 |
| WO | 2019089774 A1 | 5/2019 |
| WO | 2019089778 A1 | 5/2019 |

OTHER PUBLICATIONS

Brendan Koemer, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.
Office Action dated Mar. 8, 2021 for U.S. Appl. No. 16/415,654 (pp. 1-12).
Office Action (Non-Final Rejection) dated Feb. 1, 2022 for U.S. Appl. No. 17/222,763 (pp. 1-9).
Office Action (Notice of Allowance and Fees Due (PTOL-85)) dated Aug. 11, 2021 for U.S. Appl. No. 16/902,186 (pp. 1-8).
Office Action (Notice of Allowance and Fees Due (PTOL-85)) dated Aug. 25, 2021 for U.S. Appl. No. 16/415,654 (pp. 1-10).
Office Action (Notice of Allowance and Fees Due (PTOL-85)) dated Oct. 6, 2021 for U.S. Appl. No. 16/864,800 (pp. 1-9).
Office Action (Notice of Allowance and Fees Due (PTOL-85)) dated Nov. 26, 2021 for U.S. Appl. No. 16/778,743 (pp. 1-9).
Office Action (Notice of Allowance and Fees Due (PTOL-85)) dated Dec. 8, 2021 for U.S. Appl. No. 16/778,768 (pp. 1-8).
Office Action (Notice of Allowance and Fees Due (PTOL-85)) dated Dec. 21, 2021 for U.S. Appl. No. 16/837,655 (pp. 1-8).
Office Action (Notice of Allowance and Fees Due (PTOL-85)) dated Dec. 23, 2021 for U.S. Appl. No. 16/778,841 (pp. 1-9).
Office Action (Notice of Allowance and Fees Due (PTOL-85)) dated Jan. 14, 2022 for U.S. Appl. No. 16/778,923 (pp. 1-8).
Office Action (Notice of Allowance and Fees Due (PTOL-85)) dated Jan. 13, 2022 for U.S. Appl. No. 16/864,800 (pp. 1-7).
Office Action (Notice of Allowance and Fees Due (PTOL-85)) dated Feb. 2, 2022 for U.S. Appl. No. 16/778,889 (pp. 1-8).
Office Action (Notice of Allowance and Fees Due (PTOL-85)) dated Feb. 8, 2022 for U.S. Appl. No. 16/778,987 (pp. 1-8).
Office Action (Notice of Allowance and Fees Due (PTOL-85)) dated Mar. 9, 2022 for U.S. Appl. No. 16/841,957 (pp. 1-9).
Office Action (Final Rejection) dated May 13, 2022 for U.S. Appl. No. 17/222,763 (pp. 1-11).
Office Action (Non-Final Rejection) dated Aug. 30, 2022 for U.S. Appl. No. 17/222,763 (pp. 1-11).
Office Action (Notice of Allowance and Fees Due (PTOL-85)) dated Jan. 5, 2023 for U.S. Appl. No. 17/222,763 (pp. 1-7).
Office Action (Non-Final Rejection) dated Jan. 18, 2023 for U.S. Appl. No. 17/671,388 (pp. 1-6).
Office Action (Notice of Allowance and Fees Due (PTOL-85)) dated Feb. 10, 2023 for U.S. Appl. No. 17/721,152 (pp. 1-10).
Notice of Allowance dated Apr. 14, 2023 for U.S. Appl. No. 17/529,050 (pp. 1-9).
Office Action (Non-Final Rejection) dated Apr. 12, 2023 for U.S. Appl. No. 17/543,339 (pp. 1-5).
Office Action (Non-Final Rejection) dated Mar. 16, 2023 for U.S. Appl. No. 17/529,050 (pp. 1-13).
Office Action (Non-Final Rejection) dated Mar. 16, 2023 for U.S. Appl. No. 17/529,069 (pp. 1-13).
Office Action (Notice of Allowance and Fees Due (PTOL-85)) dated Apr. 14, 2023 for U.S. Appl. No. 17/529,069 (pp. 1-9).
Office Action (Notice of Allowance and Fees Due (PTOL-85)) dated Apr. 26, 2023 for U.S. Appl. No. 17/671,388 (pp. 1-9).
Office Action (Notice of Allowance and Fees Due (PTOL-85)) dated May 10, 2023 for U.S. Appl. No. 17/543,339 (pp. 1-5).
Office Action (Notice of Allowance and Fees Due (PTOL-85)) dated Jun. 7, 2023 for U.S. Appl. No. 17/697,637 (pp. 1-9).
Australian Examination Report No. 1 issued in App. No. AU2019219795, dated Oct. 16, 2023, 4 pages.
Office Action (Non-Final Rejection) dated Dec. 6, 2023 for U.S. Appl. No. 17/844,466 (pp. 1-7).
Office Action (Notice of Allowance and Fees Due (PTOL-85)) dated Feb. 22, 2024 for U.S. Appl. No. 17/705,010 (pp. 1-9).
Office Action (Non-Final Rejection) dated Mar. 7, 2024 for U.S. Appl. No. 18/351,965 (pp. 1-38).
Office Action (Non-Final Rejection) dated Mar. 7, 2024 for U.S. Appl. No. 18/351,962 (pp. 1-38).
Notice of Allowance dated Mar. 22, 2024 for U.S. Appl. No. 17/858,769 (pp. 1-9).
Notice of Allowance dated Apr. 16, 2024 for U.S. Appl. No. 17/844,466 (pp. 1-5).
Office Action (Notice of Allowance and Fees Due (PTOL-85)) dated Apr. 16, 2024 for U.S. Appl. No. 17/844,466 (pp. 1-5).
Australian Examination Report No. 1 issued in App. No. AU2023201845, daated Jun. 12, 2024, 4 pages.
Office Action (Non-Final Rejection) dated Jun. 18, 2024 for U.S. Appl. No. 17/857,988 (pp. 1-18).
Office Action (Notice of Allowance and Fees Due (PTOL-85)) dated Jul. 9, 2024 for U.S. Appl. No. 17/858,769 (pp. 1-8).
Office Action (Notice of Allowance and Fees Due (PTOL-85)) dated Jul. 16, 2024 for U.S. Appl. No. 18/351,965 (pp. 1-8).
Office Action (Notice of Allowance and Fees Due (PTOL-85)) dated Jul. 16, 2024 for U.S. Appl. No. 18/351,962 (pp. 1-8).
Office Action (Non-Final Rejection) dated Jul. 29, 2024 for U.S. Appl. No. 17/709,146 (pp. 1-7).
Office Action (Notice of Allowance and Fees Due (PTOL-85)) dated Aug. 14, 2024 for U.S. Appl. No. 17/858,769 (pp. 1-2).
Office Action (Non-Final Rejection) dated Aug. 19, 2024 for U.S. Appl. No. 18/364,231 (pp. 1-6).
Office Action (Non-Final Rejection) dated Aug. 20, 2024 for U.S. Appl. No. 17/858,009 (pp. 1-9).
Office Action (Non-Final Rejection) dated Sep. 6, 2024 for U.S. Appl. No. 18/302,542 (pp. 1-5).
Office Action (Non-Final Rejection) dated Sep. 25, 2024 for U.S. Appl. No. 18/461,233 (pp. 1-11).
Office Action (Notice of Allowance and Fees Due (PTOL-85)) dated Nov. 8, 2024 for U.S. Appl. No. 17/709,146 (pp. 1-8).
Office Action (Notice of Allowance and Fees Due (PTOL-85)) dated Nov. 27, 2024 for U.S. Appl. No. 18/302,542 (pp. 1-5).
Office Action (Final Rejection) dated Nov. 25, 2024 for U.S. Appl. No. 17/857,988 (pp. 1-22).
Office Action (Notice of Allowance and Fees Due (PTOL-85)) dated Dec. 13, 2024 for U.S. Appl. No. 18/364,231 (pp. 1-5).
Australian Examination Report No. 1 issued in App. No. AU2020203526 dated Feb. 17, 2025, 9 pages.
Australian Examination Report No. 1 issued in App. No. AU2020203525, dated Feb. 3, 2025, 10 pages.

* cited by examiner

SYSTEMS AND METHODS FOR GAMING MACHINE DIAGNOSTIC ANALYSIS

CROSS REFERENCE TO RELATED APPLICATIONS

This application is a continuation of and claims priority to U.S. patent application Ser. No. 17/222,763, filed Apr. 5, 2021, which claims priority to U.S. Provisional Patent Application No. 63/022,192, filed May 8, 2020, the entire contents of which are hereby incorporated by reference in their entireties.

TECHNICAL FIELD

The field of the disclosure relates to electronic gaming, and more particularly to diagnostic systems and methods for electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs must function in a variety of operating environments and conditions, and the performance of the machine may be affected by many different environmental, mechanical, maintenance and age related factors. Additionally, in some instances unsavory players have developed sophisticated cheats that can be used to compromise the operation of EGMs (e.g., slot machines), for example by "cracking" the RNG being used by the EGM without breaking into the device or otherwise altering the device's operation. In other instances, such a player may attempt to install a device, or otherwise electronically communicate with the EGM to affect the player's outcome on the EGM. Although any particular exploit or factor does not necessarily guarantee a winning outcome on any particular spin, but such exploits and factors may in some instances increase the odds that the player will receive a winning outcome. As such, over time, the player can possibly achieve a performance disproportionate to the configured settings of the machine. However, due to the large numbers of various different EGMs and locations at which the EGMs may be located, it can be difficult and time consuming to determine what factors may be influencing the operation of the EGMs, or if other factors may necessitate that an EGM receive maintenance. In other situations, manufacturers may have very little visibility or ability to determine the state of an EGM after it has left its assembly plant and the conditions under which it has been subjected to during transit or installation.

SUMMARY

In one embodiment, a diagnostic device for an electronic gaming machine (EGM) includes a power supply, an attachment device configured to couple the diagnostic device to the EGM, a sensor array including at least one sensor for sensing a condition associated with the EGM and configured to generate conditions data based on the sensed condition, a communications device configured to transmit the conditions data to a remote location, a memory configured to store the conditions data, and a processor configured to analyzed the conditions data and determine a diagnostic evaluation based upon the analyzed conditions data.

In another embodiment, a diagnostic system for electronic gaming machines (EGMs) includes a power supply, and a diagnostic device in electrical connection with the power supply, the diagnostic device configured for placement within a cabinet of an EGM. The diagnostic device includes an attachment device configured to couple the diagnostic device to the EGM, a sensor array including at least one sensor for sensing a condition associated with the EGM and configured to generate conditions data based on the sensed condition, a communications device configured to transmit the conditions data to a remote location, a memory configured to store the conditions data, and a processor configured to analyzed the conditions data and determine a diagnostic evaluation based upon the analyzed conditions data.

In yet another embodiment, a method of evaluating an electronic gaming machine (EGM), includes placing a diagnostic device in communication with the EGM. The diagnostic device includes a power supply, an attachment device configured to couple the diagnostic device to the EGM, a sensor array including at least one sensor for sensing a condition associated with the EGM and configured to generate conditions data based on the sensed condition, a communications device configured to transmit the conditions data to a remote location, a memory configured to store the conditions data, using the sensor array to collect conditions data of the EGM, storing the conditions data in the memory, using a processor to analyze the conditions data and determine a diagnostic evaluation of the EGM based upon the analyzed conditions data.

In yet another embodiment, a diagnostic device for an electronic gaming machine (EGM) includes a power supply and an agnostic diagnostic device in electrical connection with the power supply, the diagnostic device configured for placement within a cabinet of an EGM. The diagnostic device comprises a sensor array including at least one sensor for sensing a condition associated with the EGM and configured to generate conditions data based on the sensed condition, a memory configured to store the conditions data, and a communications device configured to transmit the conditions data to a remote location.

In yet another embodiment, a method of performing a diagnostic evaluation of an electronic gaming machine (EGM) includes placing a diagnostic device within a cabinet of an EGM. The diagnostic device comprises an attachment device configured to couple the diagnostic device to the EGM, a sensor array including at least one sensor for sensing a condition associated with the EGM and configured to generate conditions data based on the sensed condition, a communications device configured to transmit the conditions data to a remote location; and a memory configured to store the conditions data. The method further includes transmitting the conditions data to a remote processor configured to analyze the conditions data and determine a diagnostic evaluation based upon the analyzed conditions data.

BRIEF DESCRIPTION OF THE DRAWINGS

Example embodiments of the subject matter disclosed will now be described with reference to the accompanying drawings.

DETAILED DESCRIPTION

The systems, methods, and devices described herein provide a platform-neutral diagnostic solution that unobtrusively facilitates improved detection and analysis of factors affecting an EGM, thereby enhancing the integrity and stability of the EGMs using this system. The disclosed devices, systems, and methods detect conditions and factors affecting an EGM and provide analysis and diagnostic evaluation of EGMs using this system.

A platform neutral diagnostic system and associated methods are described herein that provide a technical solution to detecting environmental, mechanical, maintenance and age related factors (broadly, "operational factors" or "diagnostic evaluations") of EGMs, thereby improving the operational stability and functionality of EGMs. In an example embodiment, the diagnostic system includes a diagnostic device installed within an EGM such that the diagnostic system can detect, store, analyse and transmit various operational factors, or conditions data, of the EGM, in real time, to assess various conditions associated with the EGM. EGM operational factors may include environmental, mechanical, maintenance and age related factors, including but not limited to, temperature, humidity, vibration, shock, voltage, tilt, motion, light, video, images, access, time of day, age, maintenance time, location, player motion and facial expression, power condition, air pressure, air quality, sound, and the like, each of which may be sensed or measured as an ambient (or environmental) condition, an internal condition or an individual component condition. In some embodiments, the diagnostic system compares the EGM conditions data against one or more pre-configured diagnostic profiles to detect irregularity conditions (e.g., high temperature, heavy shock, tilt, vibration) that exceed a predetermined threshold value for a steady state condition of the factor. In some embodiments, the diagnostic system compares the EGM conditions data against historical EGM conditions data (e.g., historical data specific to that EGM, location, machine type or the like) to detect irregularity conditions. In some embodiments, the diagnostic system uses the EGM conditions data to build a machine learning (i.e., artificial intelligence) model that may be subsequently used to identify irregularities in EGM operation.

Figure 1:
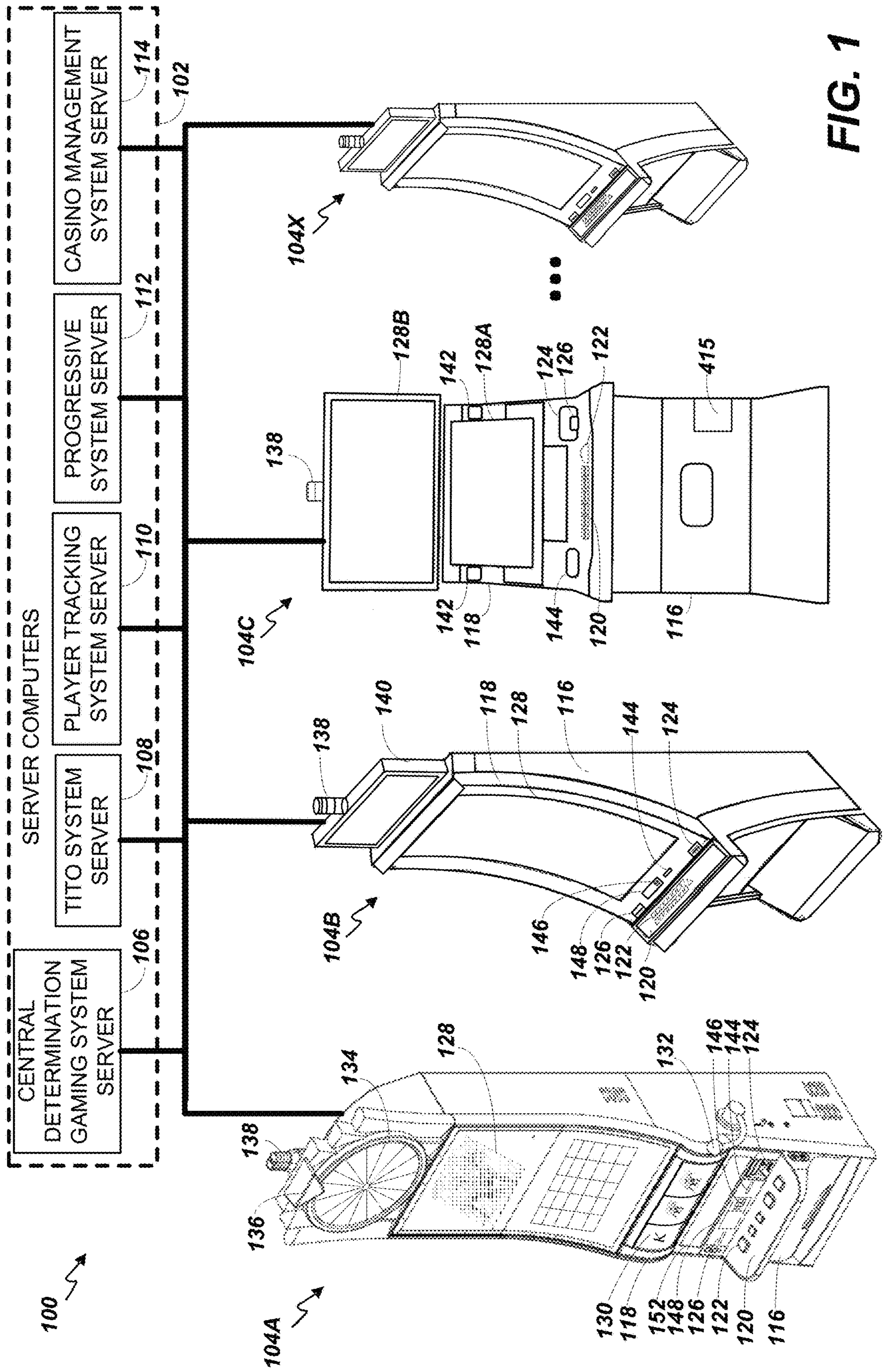
FIG. 1 is an exemplary diagram showing EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat®

Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

Figure 2A:
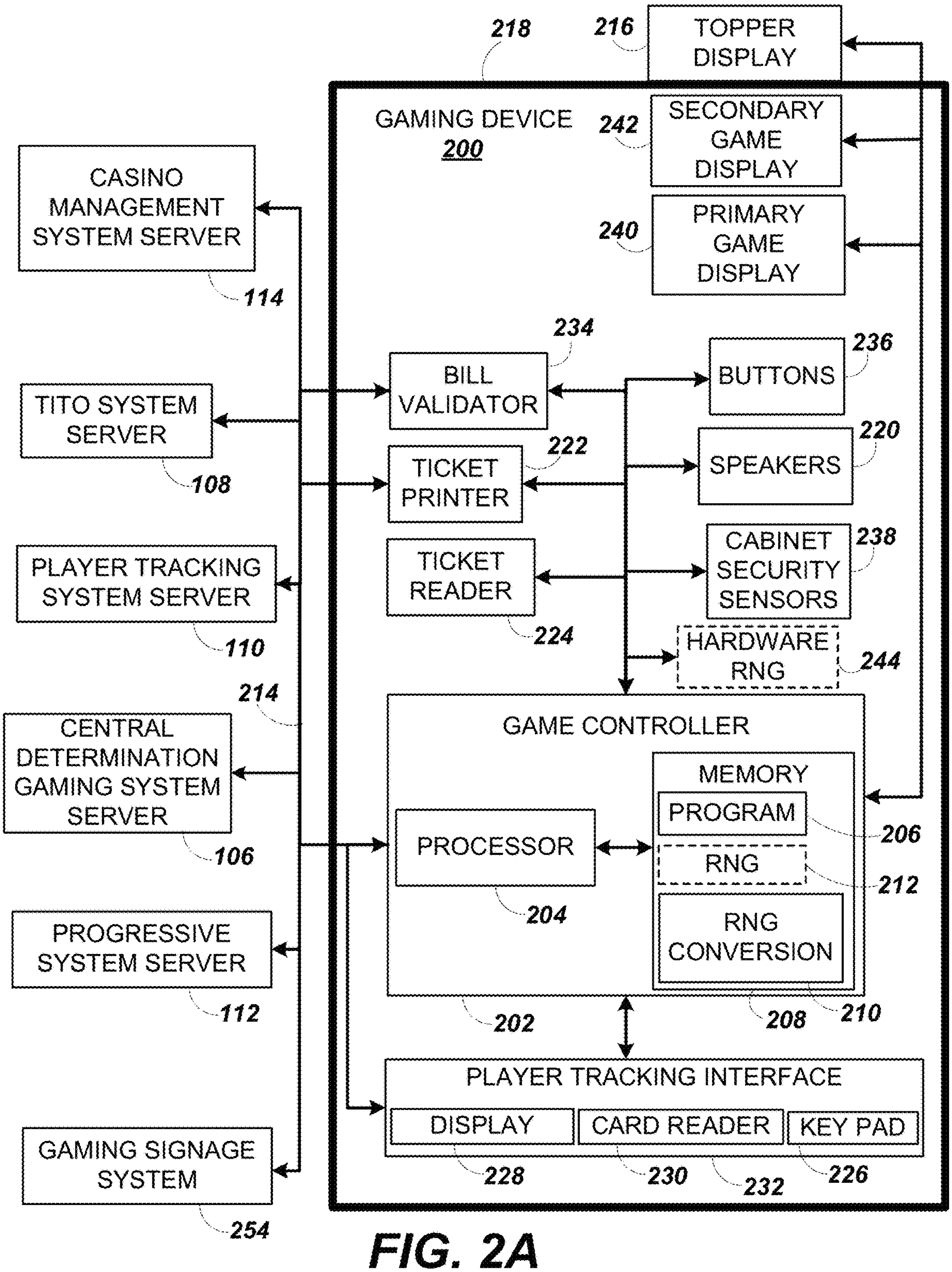
FIG. 2A is a block diagram showing various functional elements of an exemplary EGM.

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
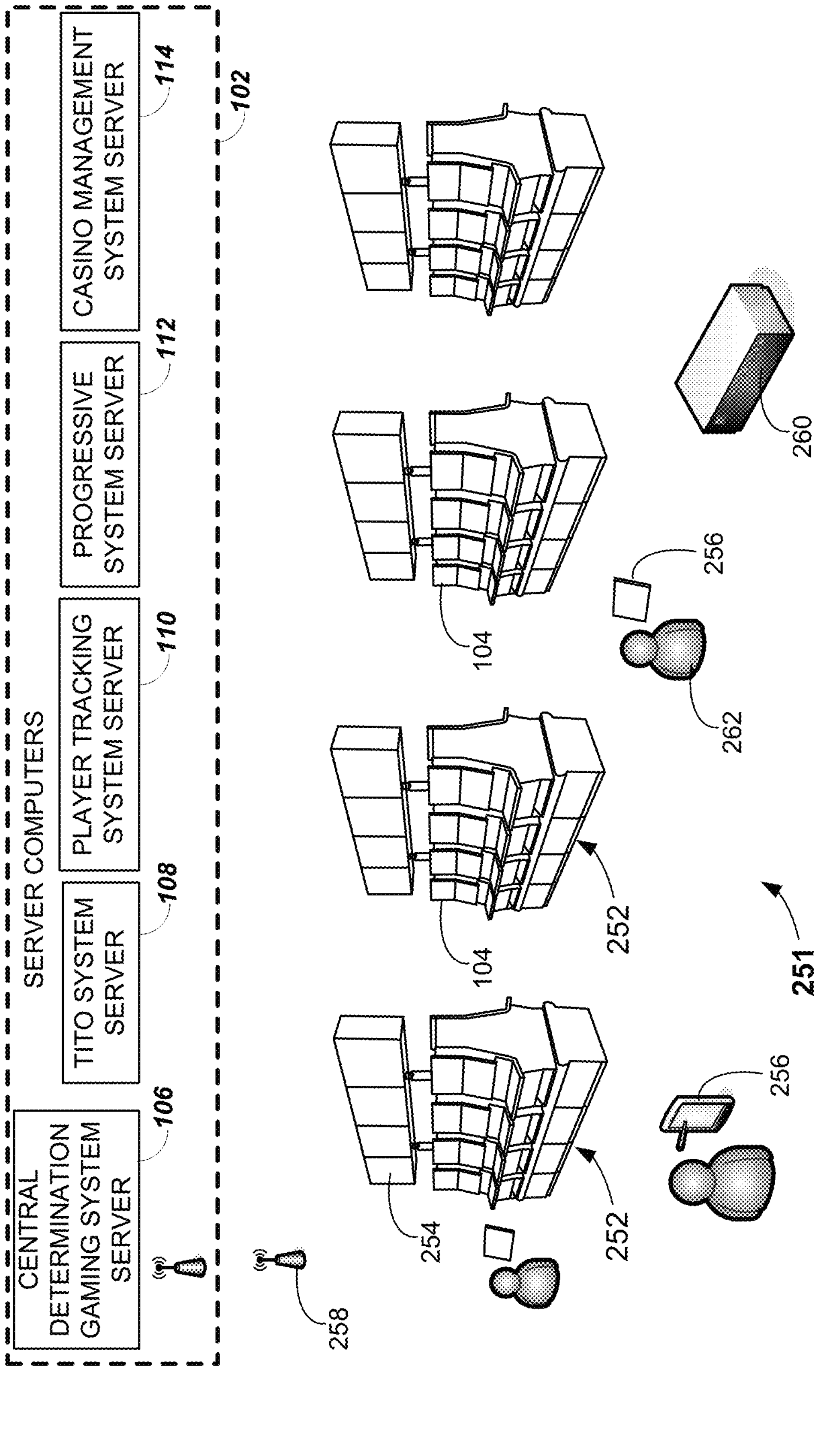
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2B). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
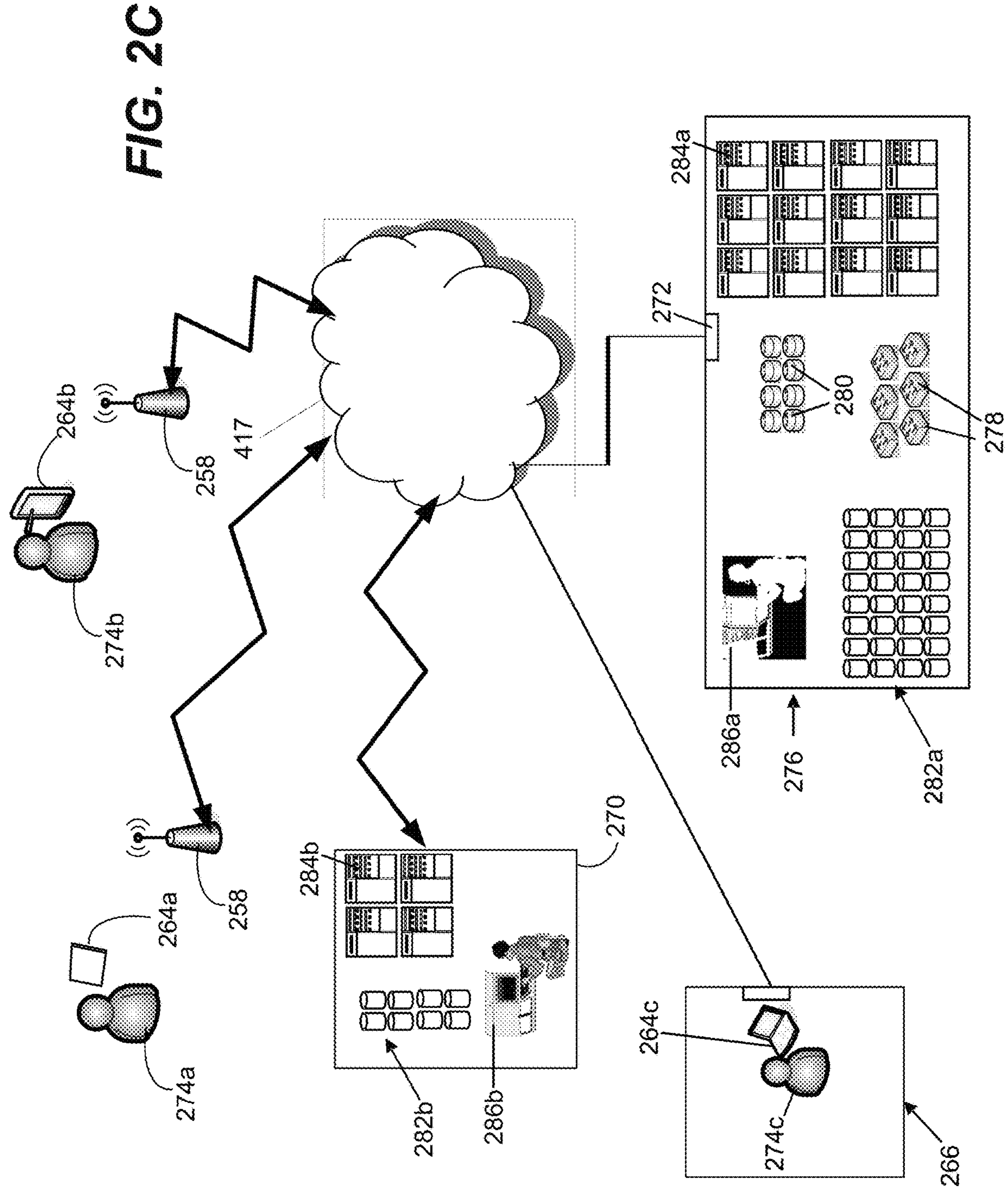
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication.

Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
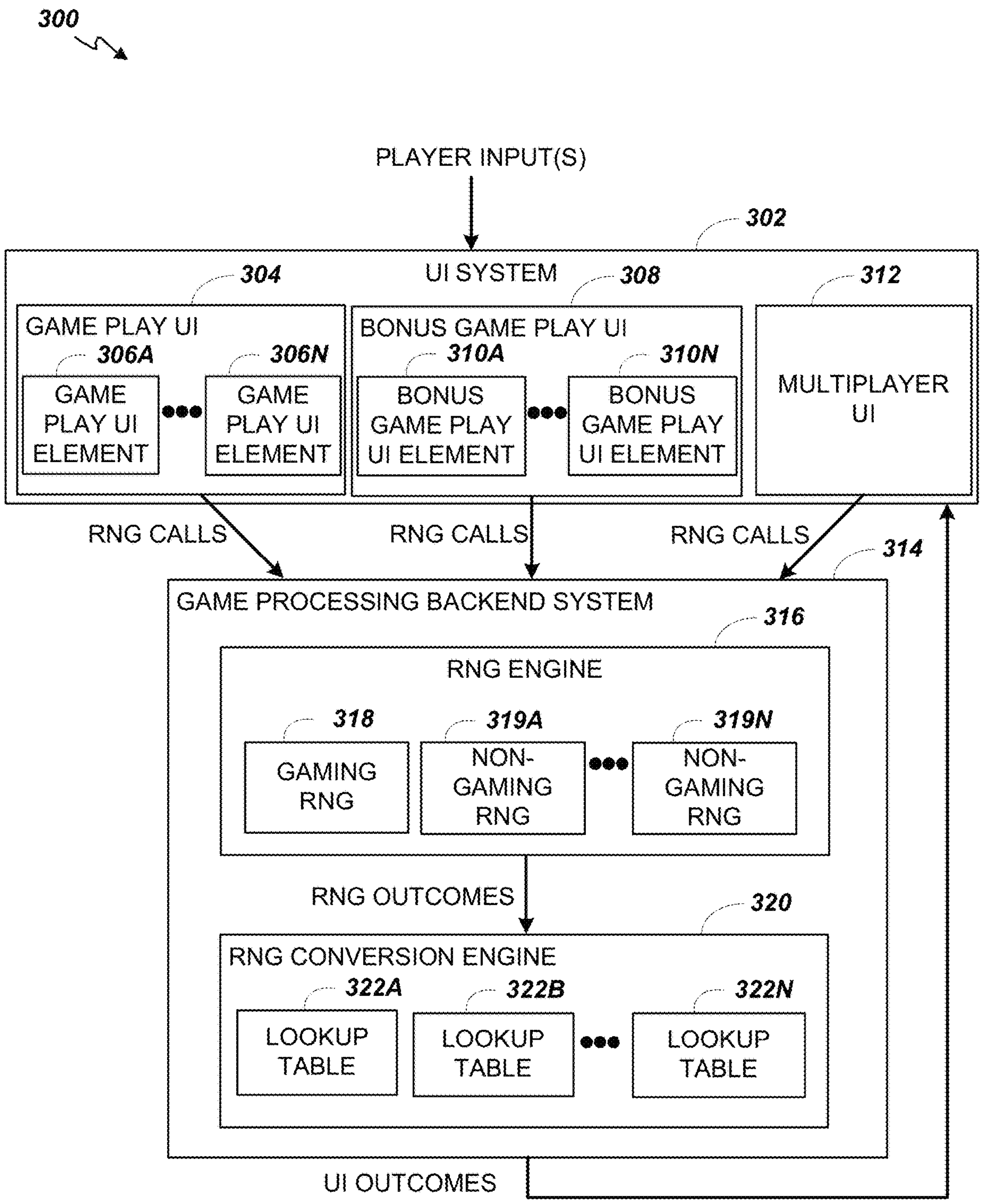
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2A, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2B, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 3, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
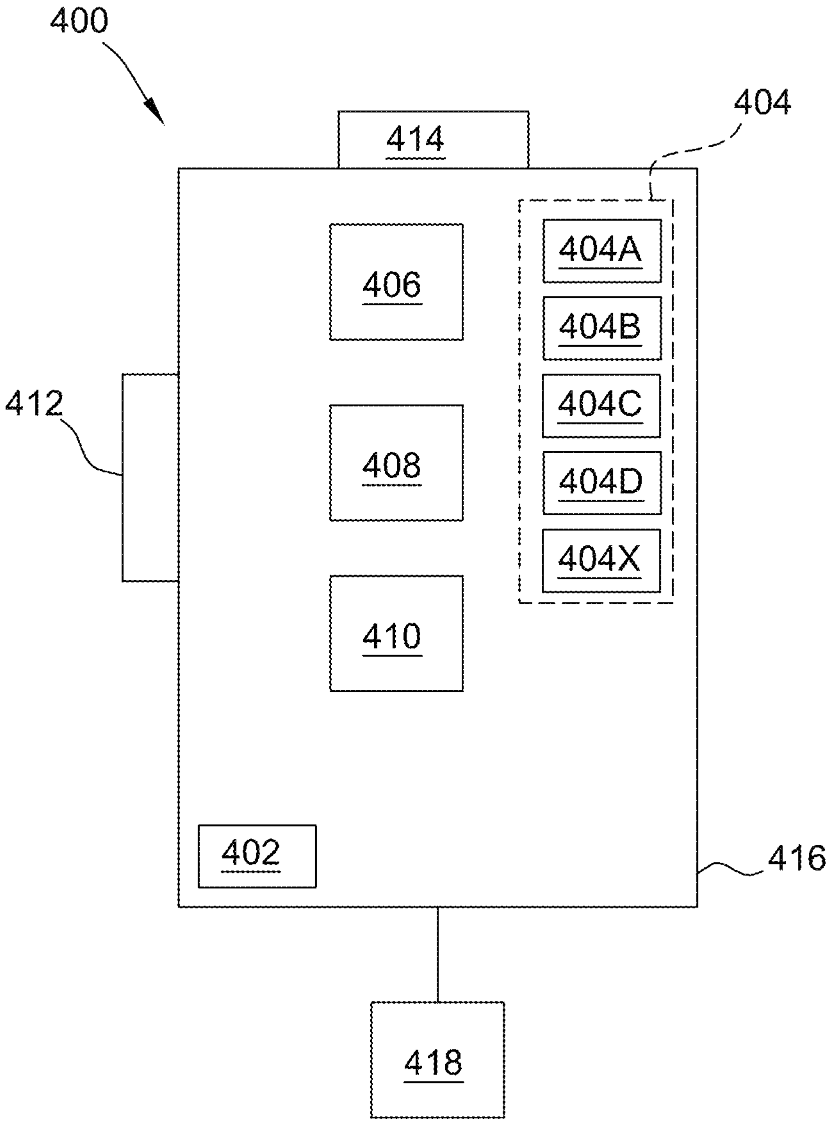
FIG. 4 is a component diagram of a diagnostic device of the present disclosure.

With reference to FIG. 4, an embodiment of a diagnostic device 400 for an EGM is described. In one embodiment, the diagnostic device 400 is configured to be placed within main cabinet 116 (shown in FIG. 1), and may be secured to main cabinet 116 via an attachment device 412, such as a screw plate, adhesive, hook and loop fastener or any other permanent or temporary attachment device. Diagnostic device 400 includes a casing 416 for housing within it a multitude of components. Diagnostic device includes a power supply 402, which may be a self-contained unit such as a rechargeable or non-rechargeable battery or a unit designed to draw power through a connection to an external source, such as a power receptacle or from an EGM 104A-104X (shown in FIG. 1). In one embodiment, the power supply 402 includes both a rechargeable battery capable of powering the unit as well as a connection to an external power source. In such embodiment, the diagnostic device 400 may be powered by the rechargeable battery during a time when it is not connected to the external power source, and when the external power source is connected, the diagnostic device is further configured to provide power to the rechargeable battery for recharging the rechargeable battery. The diagnostic device 400 also includes one or more sensors 404A-404X for sensing one or more conditions, or operational factors, associated with the EGM, further described below. In some embodiments, the sensors 404A-404X are connected as a sensor array 404. The sensors 404A-404X are electrically coupled to power supply 402 to draw power therefrom. As shown in FIG. 4, the diagnostic device also includes a communications device 406, a memory 408 and processor 410.

In some embodiments, diagnostic device 400 includes a communications port 414 that is configured to be plugged into a diagnostics port 415 located on or within main cabinet 116 (shown in FIG. 1). The communications port 414 may be configured to receive data and or power from diagnostics port 415.

In some embodiments, the sensors 404A-404X include sensors capable of detecting or measuring conditions such as, for example, temperature, humidity, vibration, shock, tilt, voltage, motion, light, video, images, access, time of day, age, maintenance time, location, player motion and facial expression, power condition, air pressure, air quality, sound, and the like, each of which may be sensed, sampled, or measured as an ambient (or environmental) condition, an internal condition or an individual component condition to create measured conditions data associated with the respective condition measured by the relevant sensor. In yet other embodiments, internet traffic or software code may be monitored for electronic based attacks, such as hacking, viruses, ransomware, communication blockages, or the like. The terms "sensed," "sampled" and "measured" as used herein refer to a sensor detecting a condition and associating a value to the detected condition. As it should be understood, one or more of sensors 404A-404X may be located remotely of casing 416, such as in the case of a sensor that monitors a condition external of main cabinet 116. In such embodiments, the remotely located sensors include a communications device (not shown), which may be a transmitter or transceiver capable of sending data to communications device 406, such as via a wired connection, Bluetooth®, Wi-Fi, cellular, or any other physical or wireless electronic communication that allows diagnostic device 400 to function as described herein.

Each of the sensors 404A-404X may be configured to sample conditions on a substantially continuous (i.e., "real time") or periodic basis, such as on a predetermined or selectable time interval. Upon sampling a condition, the sensor 404A-404X may store the measured value within an internal memory device for later transmission to an external location via communications device 406, or may immediately transmit the measured value to memory 408 or processor 410, in some embodiments via communications device 406. Each of the measured values transmitted from the sensors 404A-404X are stored in memory 408. In some embodiments, processor 410 is configured to analyze the measured values and output a determination result or diagnostic evaluation, as further described below.

In some embodiments, the diagnostic device 400 is configured to be platform neutral, allowing the diagnostic device to be used on substantially any make, model or brand of EGM. In such an embodiment, components of the EGM that make connections to the EGM 104A-104X are configured to be device independent, such as by using an industry standard connection design or protocol. For example, in one embodiment, the power supply 402 is self-contained using a battery to supply power to the diagnostic device 400. In one embodiment, the power supply 402 is a smart power supply that is capable of recording power related data, such as power outages, power spikes, power quality, brown-outs, power instability, and the like. Further, the sensor array 404 uses sensors 404A-404X that are capable of sensing conditions associated with the EGM without requiring a unique (e.g., proprietary) connection to the EGM, such as sensors for temperature, humidity, vibration, shock, tilt, voltage, motion, light, video, images, access, time of day, age, maintenance time, location, player motion and facial expression, power condition, air pressure, air quality, sound, and the like that are considered device neutral. It should be understood that industry standard connections, such as Wi-Fi, Bluetooth or the like may be used for communication between the EGM and the diagnostic device. In some embodiments, the one or more of sensors 404A-404X are digital sensors, and in other embodiments one or more of the sensors 404A-404X are analog sensors.

Figure 5:
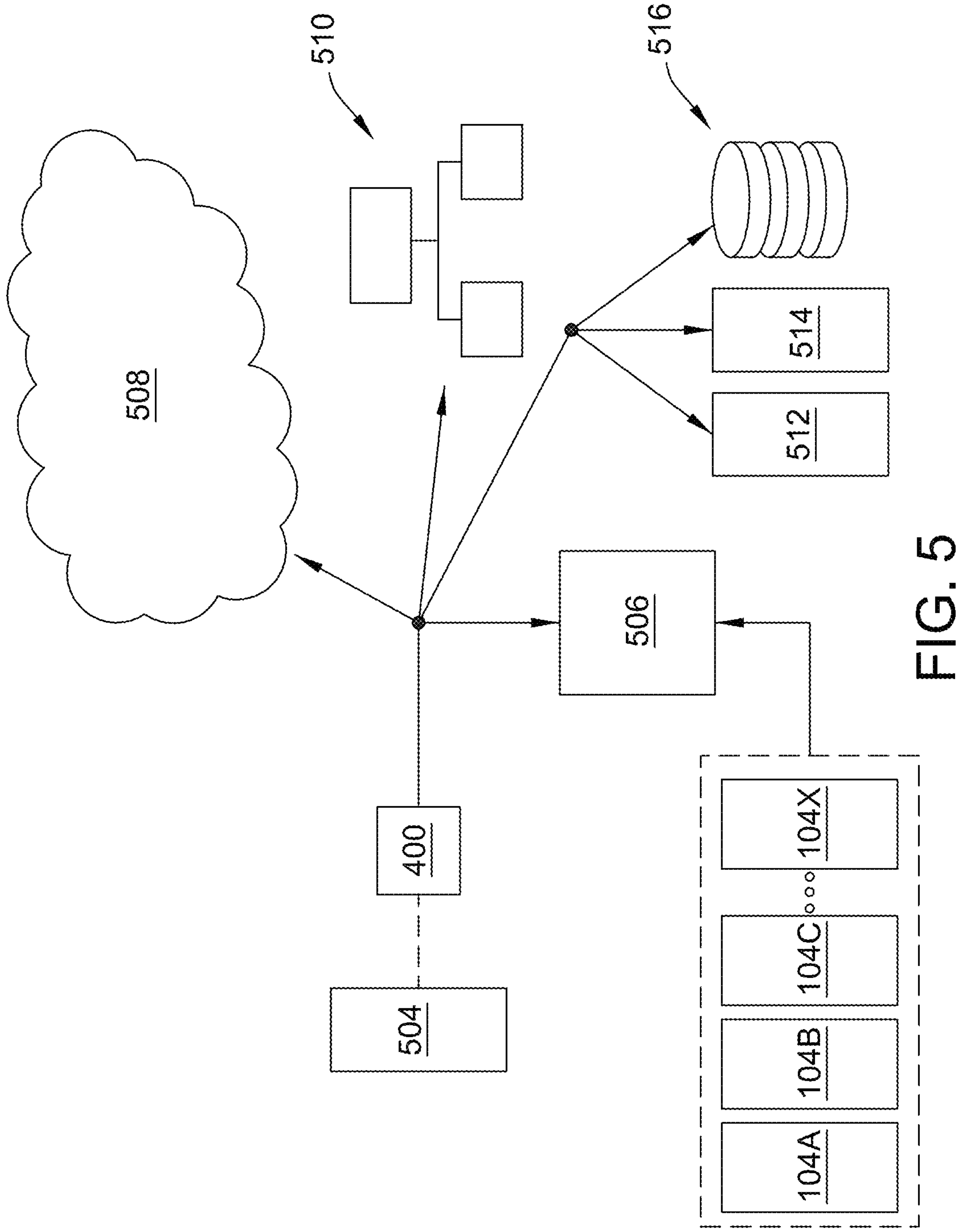
FIG. 5 is a block diagram of a system architecture including the diagnostic device shown in FIG. 3.
Figure 6:
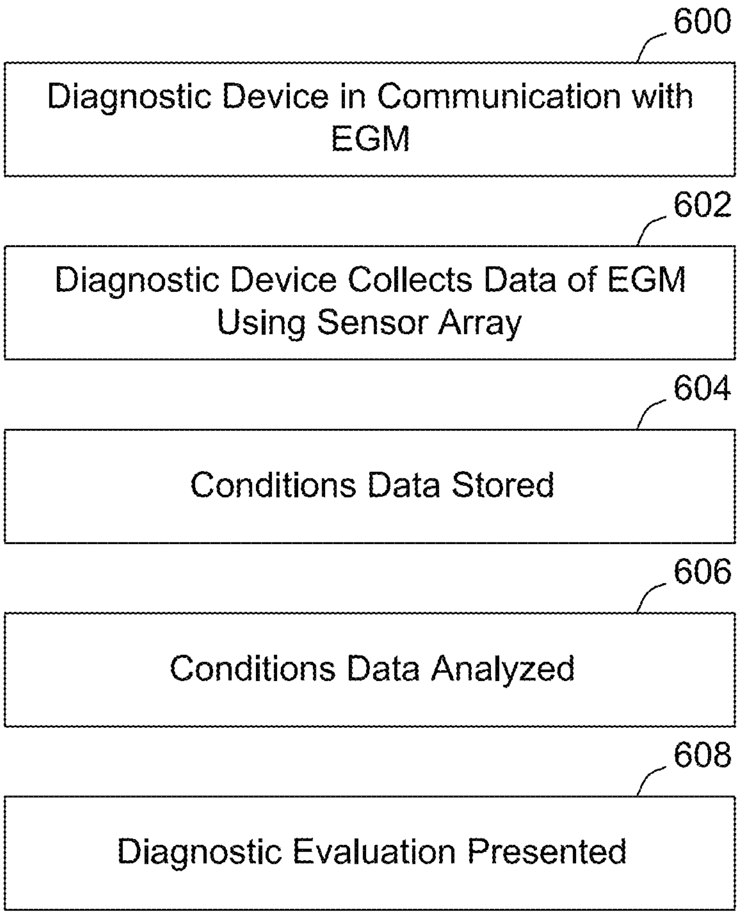
FIG. 6 is a block diagram showing the process operations of a method according to the present disclosure.

With reference to FIGS. 4-6, embodiments of the operation of the diagnostics device 400 are described. In one embodiment, diagnostic device 400 is in communication 600 with EGM 504 (which may be similar to any of EGM

104A-104X) via communications port 414. Diagnostics device 400 monitors one or more conditions associated with EGM 504 using sensors 404. Measured conditions data from each of the sensors 404 is sampled 602 and then saved 604 to memory 408 at predetermined time period. The predetermined time period may be user selected to be any time period desired, such as continuous or real time, 1 second, 1 minute, 5 minutes, 15 minutes, 30 minutes, 1 hour, 6 hours, 12 hours, 24 hours, or any other time period that allows the systems and methods to function as described herein. As should be understood, each individual sensor 404A-404X may use a different predetermined time period for condition sampling 602 and saving 604, as may be selected by a user. In some embodiments measured conditions data from one or more sensor 404A-404X may be sampled upon occurrence of an event (event driven), e.g., a measured value of conditions data from a first sensor exceeding a threshold value (e.g. temperature), triggers the sampling of a measured value of conditions data from a second sensor (e.g. air quality). In some embodiments, the measured conditions data may be sampled on-demand, for example upon receiving a communication from a casino operator or the like instructing the diagnostic device to measure conditions data using one or more of the sensors 404A-404X.

In one embodiment, the diagnostic device 400 is installed within, or on, EGM 504 at a place of manufacture of EGM 504. In this embodiment, the diagnostic device 400 is affixed to EGM 504 in order to monitor one or more conditions associated with EGM 504 during shipping to a destination, such as an installation destination of the EGM 504. For example, an installation destination may be a casino or other gaming location separate from the location of manufacture. In such embodiment, the diagnostic device may be placed into an active mode to begin monitoring the conditions once the EGM has been loaded onto a truck or otherwise leaves the manufacturing facility. Accordingly, conditions such as vibration, tilt, shock, temperature or the like may be monitored during transit to ensure that the EGM 504 has not been mishandled or tampered with during transportation, delivery or installation of the EGM 504. In one embodiment, the diagnostic device 400 utilizes communication device 406 to transmit the sampled conditions data from the diagnostic device 400 to a remote location for analysis, such as to one or more of EGM gateway device 506, cloud computing device 508, casino network device 510, database 516, mid-tier server 514, or department computing device 512, or to the manufacturer's computer network via a direct or indirect connection to communication device 406. Such direct or indirect connection may be via any wired or wireless communications system such as Bluetooth, Wi-Fi, cellular data, and the like. In one embodiment, a cellular connection is used during transit of the EGM 504 during periods of time where other modes of communication are unavailable or unsuitable. In yet another embodiment, the diagnostic device 400 may store 604 any diagnostic data collected 602 in an onboard memory or the like, or upload such data to a remote memory at a cloud storage or server. Accordingly, the manufacturer may be able to determine mishandling of the machine or other undesirable conditions to which the EGM 504 may have been exposed to, which may facilitate error or malfunction diagnosis and remediation.

In one embodiment, the casino network device 510 may be one or more mobile robotic devices capable of transmitting and receiving the sampled conditions data. For example, the robotic devices may be wheeled or tracked robotic devices that perform scheduled or random passes by an EGM 504 to collect the sampled conditions data. In one embodiment, the robotic devices may be equipped with Wi-Fi or short range wireless communication devices capable of communicating with the communication device 406 of the diagnostic device. The robotic devices may analyze 606 the sampled conditions data as described herein, or in other embodiments may store the data and further transmit the data to one or more of EGM gateway device 506, cloud computing device 508, casino network device 510, database 516, mid-tier server 514, or department computing device 512, or to the manufacturer's computer network for analysis 606. In one embodiment, the robotic devices are configured to perform an electronic handshake with the diagnostic device, such as verifying a credential or providing an encryption key or the like, prior to initiating any data transfer.

In some embodiments, the diagnostic device 400 may be removed after installation at the EGM 504. In other embodiments, the diagnostic device 400 may be left in place to continue monitoring conditions of the EGM after installation. In yet other embodiments, the diagnostic device 400 may be installed after installation of the EGM 504 at its final destination.

In one exemplary embodiment, sensor 404A is a temperature sensor, and samples a temperature within main cabinet 116 once per minute and sends temperature data to memory 408 for storage. Processor 410 is programmed to cause the stored data to then be processed for diagnostic analysis. The diagnostic analysis may be conducted by processor 410, or via an external analysis device such as at EGM gateway device 506, cloud computing device 508, or casino network device 510. EGM gateway device 506 is configured to be communicatively coupled to one or more of EGMs 104A-104X and EGM 504, by way of a physical or wireless communication. The diagnostic analysis 606 of the stored data may include analyzing the data to determine anomalies, irregularities, aberrations, averages, norms, deviations, and the like.

In another embodiment, sensor 404A is an access sensor configured to detect when a component of the EGM 504 is accessed, such components may include a cabinet main door, bill validator door or bill validator stacker and the like. In such embodiments, the data received from the sensor may be used to determine if the EGM 504 has been tampered with, when maintenance has been performed, or other attempts to access such devices have been attempted.

In some embodiments, the diagnostic analysis involves comparing the conditions data against one or more pre-configured diagnostic profiles to detect irregularity conditions (e.g., high temperature, heavy shock, tilt, vibration) that exceed a predetermined threshold value for a steady state condition of the condition. A diagnostic profile may include a table of conditions data or one or more thresholds for the conditions data that relate to a particular EGM or ambient condition associated with an EGM. The diagnostic profile can include profiles such as a normal operational profile and irregular profiles. Accordingly, when conditions data is compared to the diagnostic profile during a diagnostic analysis, the diagnostic evaluation result may show that the evaluated conditions data falls within a normal or irregular profile. For example, an irregularity for conditions data may be when the conditions data exceeds a threshold, or normal value, by a positive or negative amount, such as by 1%, 5%, 10%, 15%, 20%, 25%, 30%, 35%, 40%, 45%, 50%, 55%, 60%, 65%, 70%, 75%, 80%, 85%, 90%, 95%, 100% or values therebetween. In other instances, an irregularity may not be found until the conditions data exceeds a threshold, or normal, value by a factor of 2 or more, such as 2x, 3x, 4x, 5x, 10x or others depending on the particular condition being analyzed. In embodiments, the threshold values may be different, or the same, for each of the different conditions data.

In some embodiments, the diagnostic analysis 606 compares the conditions data against historical EGM conditions data (e.g., historical data specific to that EGM, location, machine type or the like) to detect one or more irregularity conditions as a diagnostic evaluation. In some embodiments, the diagnostic analysis 606 uses the conditions data to build a machine learning (i.e., artificial intelligence) model that may be subsequently used to identify irregularities in operation of the EGMs 104A-104X. In one embodiment, the stored 602 conditions data may include data from a plurality of diagnostic devices each coupled to one of EGMs 104A-104X, and such data may be aggregated at EGM gateway device 506 to determine patterns, averages, anomalies, aberrations, norms, deviations and each individual EGM's data may be evaluated against such aggregated data to make diagnostic evaluations. For example, temperature data may be sampled and averaged among a plurality of EGMs, and then temperature data from EGM 504 is evaluated, if the temperature from EGM 504 is above or below a temperature threshold when compared to the averaged data, it may indicate that the EGM 504 requires service. Such analysis 606 may be conducted with any conditions sampled by sensors 404.

In some embodiments, the sampled conditions data from each diagnostic device 400 is transmitted for analysis 606 to one or more of EGM gateway device 506, cloud computing device 508, casino network device 510, database 516, mid-tier server 514, or department computing device 512, via a direct or indirect connection to communication device 406. Such direct or indirect connection may be via any wired or wireless communications system such as Bluetooth, Wi-Fi, cellular data, and the like. In some embodiments, one or more of the EGM gateway device 506, cloud computing device 508, casino network device 510, database 516, mid-tier server 514, or department computing device 512 are part of a Bluetooth network, internet of things (IoT) network or an IoT mesh network.

In some embodiments, the diagnostic device 400 includes a display device 418, such as a monitor or device capable of displaying 608 a visual representation of the diagnostic evaluation to a user. The display device 418 may be coupled to, or part of, the diagnostic device 400. However, in other embodiments, the display device 418 may be remotely located from the diagnostic device 400, but be in communication with the diagnostic device 400 via direct or indirect wired or wireless connection. In some embodiments, the display 418 can also act as a user input device for the diagnostic device, accepting user selections for time sampling or other aspects of the diagnostic device 400.

In one embodiment, cloud computing device 508 includes machine learning or artificial intelligence computing capabilities. In such embodiment, the conditions data analyzed by cloud computing device 508 is analyzed in a manner such that cloud computing device 508 may learn one or more insights from the data and be able to more accurately predict, mitigate or evaluate patterns, averages, anomalies, aberrations, norms, deviations of the EGMs 104A-104X and 504. In one embodiment, the machine learning model is capable of self-training, or using fundamentals of unsupervised learning, in order to analyze the conditions data. For example, in one embodiment, the cloud computing device 508 may aggregate data from multiple data sources, such as EGMs 104A-104X and 504. In this embodiment, the aggregated data is used to create averages or thresholds in order to make comparisons to currently analyzed conditions data to determine if the EGM 504 is functioning normally or if any anomalies, aberrations, norms, deviations or the like are occurring or require mitigation. In yet another embodiment, the machine learning may utilize the aggregated data in a predictive mode to analyze current conditions data of EGM 504, and determine in a preemptive manner, whether an issue may be imminent at the EGM 504. Accordingly, potential maintenance issues or other errors may be corrected prior to occurring, or prior to major damage being inflicted to the EGM 504. In another embodiment, if the analysis of the conditions data determines an electronic attack is happening or imminent, such as hacking, viruses, ransomware, malware, communication blockages, or the like, the diagnostic device 400 itself, or through a communication received via communications device 406, may instruct the EGM 504 to disconnect from one or more networks, disable itself or otherwise shut down or disconnect from power in order to prevent the electronic attack from spreading or causing additional damage.

In another embodiment, the analysis of the conditions data is conducted by casino network device 510. In such embodiment, the conditions data may pertain to one or more of EGMs 104A-104X which may be present within a single casino building, or within a network of casinos managed by a single operator.

In yet other embodiments, the analysis of the conditions data is conducted by a department computing device 512, which may, for example, be a computing device for a single department of a casino, such as the security department, finance department, information technology department or the like. In still other embodiments, the analysis of the conditions data is conducted by a mid-tier server 514, which may for example be a MQTT broker computer. In other embodiments, the conditions data is sent to a database 516 either prior to analysis or after the analysis has been completed for storage or aggregation with data from other devices or locations.

In some embodiments, if the analysis of the conditions data yields a result that indicates that repair or mitigation of a condition is required, (e.g., a condition that has caused the EGM 504 to go into a mode where it cannot self heal), the diagnostic device 400 may trigger an alert or send a communication via communication device 406 to a maintenance department so that maintenance personnel may be dispatched to repair the problem. In yet other embodiments, the EGM 504 may receive a set of instructions, such as a software update or patch, to update or repair itself via communication device 406.

The embodiments disclosed herein may utilize blockchain technology to log, record or verify events related to the conditions data and analysis described herein. For example, in some embodiments, one or more of EGM gateway device 506, cloud computing device 508, casino network device 510, department computing device 512, mid-tier server 514 and database 516 may include the blockchain technology. In such embodiments, a blockchain ledger of the one or more of EGM gateway device 506, cloud computing device 508, casino network device 510, department computing device 512, mid-tier server 514 and database 516 is used for logging, recording or verifying the diagnostic evaluation. In other embodiments, the blockchain is utilized to tamper-proof the EGM 504, such that the diagnostic device requires proper credentialing and authentication in the blockchain, for example through one or more of EGM gateway device 506, cloud computing device 508, casino network device 510, department computing device 512, mid-tier server 514 and database 516, prior to allowing access to any critical maintenance, network or other such components of the EGM 504.

Embodiments of the Disclosure Include the Following Non Limiting Embodiments:

Embodiment 1—A diagnostic device for an electronic gaming machine (EGM), comprising: a power supply; an attachment device configured to couple the diagnostic device to the EGM; a sensor array including at least one sensor for sensing a condition associated with the EGM and configured to generate conditions data based on the sensed condition; a communications device configured to transmit the conditions data to a remote location; a memory configured to store the conditions data; a processor configured to analyze the conditions data and determine a diagnostic evaluation based upon the analyzed conditions data.

Embodiment 2—The diagnostic device of Embodiment 1, wherein the power supply includes a battery capable of powering the sensor, the communications device, the memory and the processor.

Embodiment 3—The diagnostic device of any prior Embodiment, further comprising a communications port configured to receive at least one of data and power from the EGM.

Embodiment 4—The diagnostic device of any prior Embodiment, wherein the sensor is configured to sense at least one of temperature, humidity, vibration, shock, tilt, voltage, motion, light, video, images, access, time of day, age, maintenance time, location, player motion and facial expression, power condition, air pressure, air quality, and sound.

Embodiment 5—The diagnostic device of any prior Embodiment, wherein the sensor array includes a plurality of sensors.

Embodiment 6—The diagnostic device of any prior Embodiment, further comprising a casing for housing the power supply, the sensor array, the communications device, the memory and the processor.

Embodiment 7—The diagnostic device of any prior embodiment, wherein the communications device is configured to wirelessly transmit the conditions data to a remote location.

Embodiment 8—The diagnostic device of any prior Embodiment, wherein the diagnostic evaluation includes an indicator of at least one of a normal condition and an abnormal condition.

Embodiment 9—The diagnostic device of any prior Embodiment, wherein the processor uses artificial intelligence to analyze the conditions data and determine the diagnostic evaluation.

Embodiment 10—A diagnostic system for EGMs is described. The diagnostic system includes a power supply, a diagnostic device in electrical connection with the power supply, the diagnostic device configured for placement within a cabinet of an EGM. The diagnostic device comprises an attachment device configured to couple the diagnostic device to the EGM, a sensor array including at least one sensor for sensing a condition associated with the EGM and configured to generate conditions data based on the sensed condition, a communications device configured to transmit the conditions data to a remote location, and a memory configured to store the conditions data, and a processor configured to analyzed the conditions data and determine a diagnostic evaluation based upon the analyzed conditions data.

Embodiment 11—The diagnostic system of Embodiment 10, wherein the communications device is capable of transmitting the conditions data using at least one of Bluetooth, Wi-Fi, and Cellular data.

Embodiment 12—The diagnostic system of any of Embodiments 10-11, further comprising a plurality of diagnostic devices each placed within a different EGM and an EGM bank gateway device configured to receive the conditions data from the plurality of diagnostic devices.

Embodiment 13—The diagnostic system of any of Embodiments 10-12, wherein the processor is part of a cloud computing device in communication with the EGM bank gateway device.

Embodiment 14—The diagnostic system of any of Embodiments 10-13, wherein the cloud computing device is configured to use a blockchain ledger for at least one of recording or verifying the diagnostic evaluation.

Embodiment 15—The diagnostic system of any of Embodiments 10-14, wherein the power supply includes a battery capable of powering the sensor, the communications device, the memory and the processor.

Embodiment 16—The diagnostic system of any of Embodiments 10-15, the diagnostic device further comprising a communications port configured to receive at least one of data and power from the EGM.

Embodiment 17—The diagnostic system of any of Embodiments 10-16, wherein the sensor array is configured to sense at least one of temperature, humidity, vibration, shock, tilt, voltage, motion, light, video, images, access, time of day, age, maintenance time, location, player motion and facial expression, power condition, air pressure, air quality, and sound.

Embodiment 18—The diagnostic system of any of Embodiments 10-17, wherein the sensor array includes a plurality of sensors.

Embodiment 19—The diagnostic system of any of Embodiments 10-18, further comprising a casing for housing the power supply, the sensor array, the communications device, the memory and the processor.

Embodiment 20—The diagnostic system of any of Embodiments 10-19, wherein the communications device is configured to wirelessly transmit the conditions data to a remote location.

Embodiment 21—The diagnostic system of any of Embodiments 10-20, wherein the communications device is in communication with a cellular data network.

Embodiment 22—The diagnostic system of any of Embodiments 10-21, wherein the diagnostic evaluation includes an indicator of at least one of a normal condition and an abnormal condition.

Embodiment 23—The diagnostic system of any of Embodiments 10-22, wherein the processor uses artificial intelligence to analyze the conditions data and determine the diagnostic evaluation.

Embodiment 24—The diagnostic system of any of Embodiments 10-23, wherein the remote location includes a cloud computing device and the processor uses artificial intelligence for the diagnostic evaluation.

Embodiment 25—The diagnostic system of any of Embodiments 10-24, wherein the attachment device is device agnostic.

Embodiment 26—The diagnostic system of any of Embodiments 10-25, wherein the processor is configured to instruct the sensor array to sample conditions on a substantially continuous basis.

Embodiment 27—The diagnostic system of any of Embodiments 10-26, wherein the processor is configured to instruct the sensor array to sample conditions on a periodic basis, the periodic basis being a selectable time interval.

Embodiment 28—The diagnostic system of any of Embodiments 10-27, wherein the sensor array includes a plurality of device independent sensors.

Embodiment 29—The diagnostic system of any of Embodiments 10-28, wherein the remote location includes a casino computer network.

Embodiment 30—A method of evaluating an electronic gaming machine (EGM) includes placing a diagnostic device in communication with the EGM. The diagnostic device comprises a power supply, an attachment device configured to couple the diagnostic device to the EGM, a sensor array including at least one sensor for sensing a condition associated with the EGM and configured to generate conditions data based on the sensed condition, a communications device configured to transmit the conditions data to a remote location, a memory configured to store the conditions data. The method further includes using the sensor array to collect conditions data of the EGM, storing the conditions data in the memory, and using a processor to analyze the conditions data and determine a diagnostic evaluation of the EGM based upon the analyzed conditions data.

Embodiment 31—The method of Embodiment 30, further comprising using the communications device to wirelessly transmit the conditions data to a remote location prior to using the processor to analyze the conditions data.

Embodiment 32—The method described in any of Embodiments 30-31, further comprising using an EGM gateway device to collect the conditions data from a plurality of diagnostic devices in communication with a plurality of EGMs.

Embodiment 33—The method described in any of Embodiments 30-32, further comprising using the processor to aggregate the conditions data from the plurality of diagnostic devices, and compare the conditions data from a single one of the plurality of diagnostic devices to the aggregated conditions data to determine the diagnostic evaluation.

Embodiment 34—The method described in any of Embodiments 30-33, wherein the processor is part of a cloud computing device and the method further comprises using a blockchain ledger of the cloud computing device for at least one of recording or verifying the diagnostic evaluation.

Embodiment 35—The method described in any of Embodiments 30-34, further comprising displaying the diagnostic evaluation of the EGM on a display device.

Embodiment 36—A diagnostic device for an electronic gaming machine (EGM) comprising: a power supply, an agnostic diagnostic device in electrical connection with the power supply, the diagnostic device configured for placement within a cabinet of an EGM, the diagnostic device comprising: a sensor array including at least one sensor for sensing a condition associated with the EGM and configured to generate conditions data based on the sensed condition; a memory configured to store the conditions data; and a communications device configured to transmit the conditions data to a remote location.

Embodiment 37—The diagnostic device of Embodiment 36, further comprising a processor configured to analyze the conditions data and determine a diagnostic evaluation based upon the analyzed conditions data.

Embodiment 38—The diagnostic device of any of Embodiments 36-37, wherein the communications device is configured to be in electronic communication with a remotely located processor configured to analyze the conditions data and determine a diagnostic evaluation based upon the analyzed conditions data.

Embodiment 39—The diagnostic device of any of Embodiments 36-38, wherein the communications device comprises a cellular data network transmit and receive capability.

Embodiment 40—The diagnostic device of any of Embodiments 36-39, further comprising a processor configured to analyze the conditions data and determine a diagnostic evaluation based upon the analyzed conditions data, and wherein the processor uses artificial intelligence to analyze the conditions data to determine the diagnostic evaluation.

Embodiment 41—A method of performing a diagnostic evaluation of an electronic gaming machine (EGM), the method comprising: placing a diagnostic device within a cabinet of an EGM, the diagnostic device comprising: an attachment device configured to couple the diagnostic device to the EGM; a sensor array including at least one sensor for sensing a condition associated with the EGM and configured to generate conditions data based on the sensed condition; a communications device configured to transmit the conditions data to a remote location; and a memory configured to store the conditions data; and transmitting the conditions data to a remote processor configured to analyze the conditions data and determine a diagnostic evaluation based upon the analyzed conditions data.

Embodiment 42—The method of Embodiment 41, wherein placing the diagnostic device within the cabinet of the EGM is performed during assembly of the EGM.

Embodiment 43—The method of any of Embodiments 41-42, wherein the transmitting the conditions data comprises transmitting the conditions data to a mobile robotic device.

Embodiment 44—The method of any of Embodiments 41-43, further comprising initiating a remediation action based upon a result of the diagnostic evaluation.

Embodiment 45—The method of any of Embodiments 41-44, further comprising comparing the conditions data to a set of aggregated conditions data to determine the diagnostic evaluation.

Embodiment 46—The method of any of Embodiments 41-45, wherein transmitting the conditions data comprises transmitting the conditions data using a cellular communications device.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A diagnostic device coupled to an electronic gaming device, the diagnostic device comprising:

a sensor for sensing an internal condition of the electronic gaming device based upon the diagnostic device being coupled to the electronic gaming device;

a memory with instructions stored thereon; and a processor in communication with the sensor and the memory, wherein the instructions, when executed by the processor, cause the processor to:

during transportation of the electronic gaming device, receive conditions data from the sensor;

during the transportation of the electronic gaming device, determine that an internal irregularity of the electronic gaming device has occurred during the transportation of the electronic gaming device based on analysis of the conditions data against a threshold; and cause a remediation action to be initiated based on the internal irregularity.

2. The diagnostic device of claim 1, further comprising a sensory array including the sensor, wherein the sensor array comprises at least one sensor to monitor an ambient condition.

3. The diagnostic device of claim 1, wherein the threshold is defined in a pre-configured diagnostic profile associated with the electronic gaming device.

4. The diagnostic device of claim 1, wherein the threshold is defined based on an output from a machine learning model trained based on aggregated data associated with a plurality of electronic gaming devices.

5. The diagnostic device of claim 1, wherein the remediation action comprises automatically gathering second conditions data from a second sensor associated with the electronic gaming device.

6. The diagnostic device of claim 1, wherein the remediation action prevents potential damage to the electronic gaming device by at least one of disabling the electronic gaming device, shutting down the electronic gaming device, or disconnecting the electronic gaming device from a network.

7. The diagnostic device of claim 1, wherein causing the remediation action to be initiated comprises causing an alert to be transmitted to a computing device associated with the electronic gaming device.

8. The diagnostic device of claim 1, wherein causing the remediation action to be initiated comprises causing diagnostic evaluation data associated with the internal irregularity to be stored in an immutable ledger, and wherein the diagnostic evaluation data comprises the conditions data.

9. The diagnostic device of claim 1, wherein the internal irregularity comprises at least one of potential mishandling or potential tampering.

10. The diagnostic device of claim 1, wherein the internal irregularity comprises an irregularity associated with software associated with the electronic gaming device.

11. The diagnostic device of claim 10, wherein the remediation action comprises a software update.

12. The diagnostic device of claim 1, wherein the instructions, when executed by the processor, further cause the processor to:

transmit at least part of the conditions data to a remote computer system to perform the analysis of the conditions data against the threshold; and determine that the internal irregularity of the electronic gaming device has occurred further based at least in part upon a response from the remote computer system transmitted to the diagnostic device.

13. The diagnostic device of claim 12, wherein the remote computer system comprises at least one of a gaming machine gateway device, a cloud computing device, a casino network device, a database, a mid-tier server, a department computing device, or a manufacturer computer network.

14. The diagnostic device of claim 1, wherein the instructions, when executed by the processor, further cause the processor to analyze the conditions data against the threshold.

15. At least one non-transitory computer-readable storage medium with instructions stored thereon, wherein a diagnostic device comprises the at least one non-transitory computer-readable storage medium and is coupled to an electronic gaming device, and wherein the instructions, in response to execution by at least one processor, cause the at least one processor to:

during transportation of the electronic gaming device, receive conditions data from a sensor, wherein the sensor is configured to sense an internal condition of the electronic gaming device based upon the diagnostic device being coupled to the electronic gaming device;

during the transportation of the electronic gaming device, determine that an internal irregularity of the electronic gaming device has occurred during the transportation of the electronic gaming device based on analysis of the conditions data against a threshold; and cause a remediation action to be initiated based on the internal irregularity.

16. The at least one non-transitory computer-readable storage medium of claim 15, wherein the sensor is included in a sensor array comprising at least one sensor to monitor an ambient condition.

17. The at least one non-transitory computer-readable storage medium of claim 15, wherein the threshold is defined in a pre-configured diagnostic profile associated with the electronic gaming device.

18. The at least one non-transitory computer-readable storage medium of claim 15, wherein the threshold is defined based on an output from a machine learning model trained based on aggregated data associated with a plurality of electronic gaming devices.

19. The at least one non-transitory computer-readable storage medium of claim 15, wherein the remediation action comprises automatically gathering second conditions data from a second sensor associated with the electronic gaming device.

20. A method of performing a diagnostic evaluation for an electronic gaming device implemented by a diagnostic device coupled to the electronic gaming device, the diagnostic device comprising at least one sensor for sensing an internal condition of the electronic gaming device based upon the diagnostic device being coupled to the electronic gaming device, at least one memory, and at least one processor in communication with the at least one memory, the method comprising:

during transportation of the electronic gaming device, receiving conditions data from the at least one sensor;

during the transportation of the electronic gaming device, determining that an internal irregularity of the electronic gaming device has occurred during the transportation of the electronic gaming device based on analysis of the conditions data against a threshold; and causing a remediation action to be initiated based on the internal irregularity.

* * * * *